Jan. 4, 1966  R. R. BALAGUER  3,226,772
MOLDING APPARATUS
Filed June 19, 1963  2 Sheets-Sheet 1
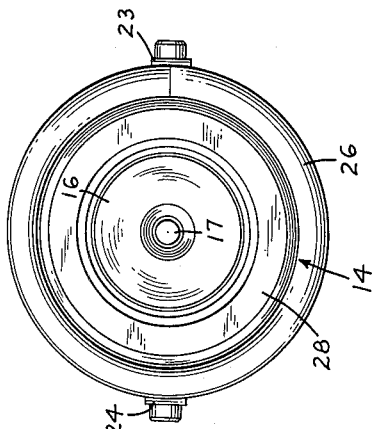
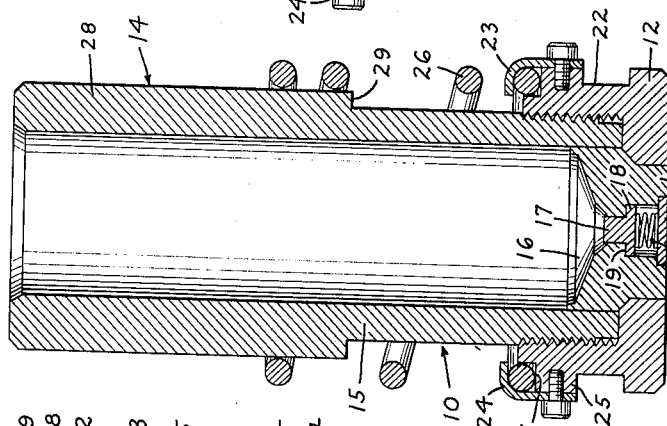
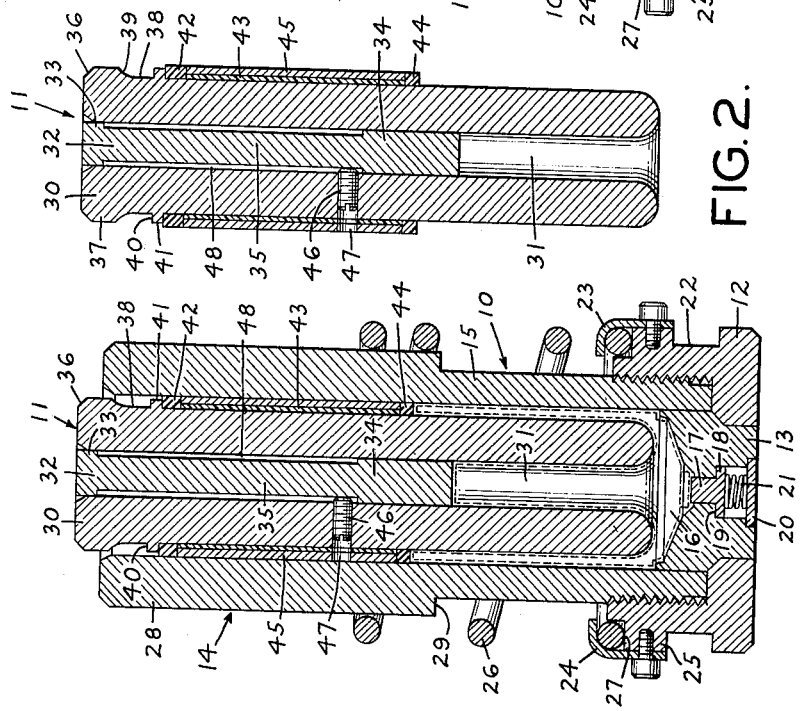

Jan. 4, 1966 R. R. BALAGUER 3,226,772
MOLDING APPARATUS
Filed June 19, 1963 2 Sheets-Sheet 2
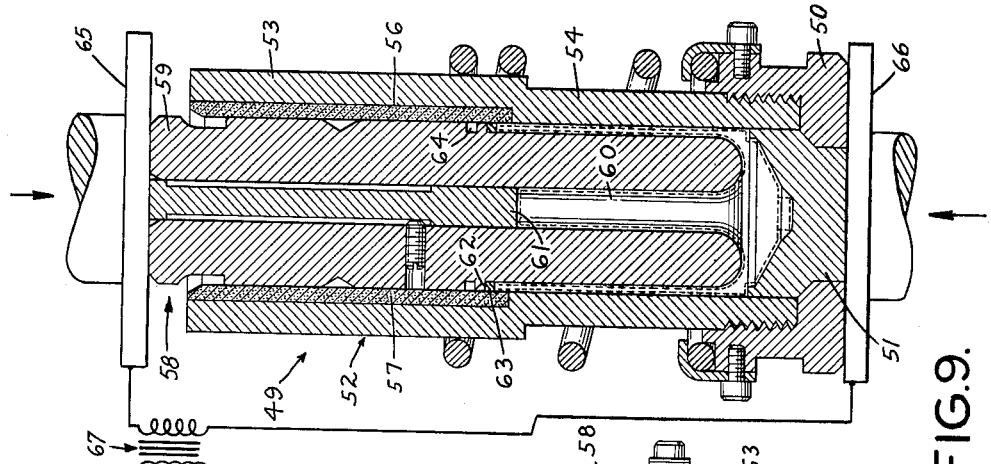
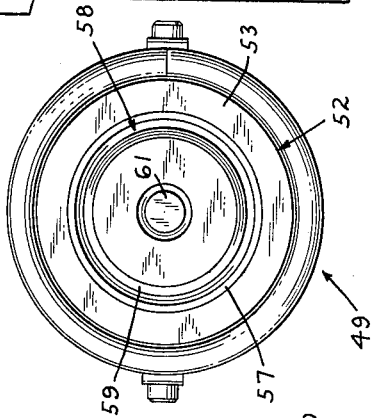
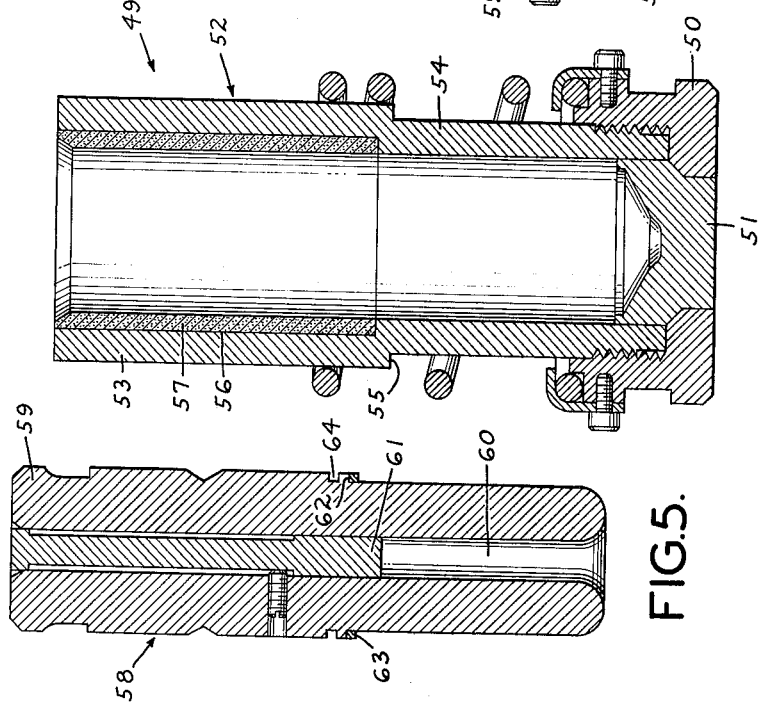

United States Patent Office 3,226,772
Patented Jan. 4, 1966

3,226,772
MOLDING APPARATUS
Rodolfo Rodriguez Balaguer, Fort Lauderdale, Fla., assignor, by mesne assignments, to Patent Holding Corporation, Fort Lauderdale, Fla., a corporation of Florida
Filed June 19, 1963, Ser. No. 289,037
4 Claims. (Cl. 18—42)

The present invention relates to molding apparatus, and more particularly to a cooperating mold and piston for molding thin-walled green carbon cups and the like.

In R. R. Balaguer United States Patent 2,903,499, granted September 8, 1959, there is described and claimed a primary battery construction in which the carbon cathode structure comprises a thin-walled self-supporting green carbon cup with a center carbon rod projecting from the base of the cup. There is also described in that patent a molding method and a molding apparatus for making such cathode structures.

The commercial manufacture of dry cell batteries requires that they be made in high speed repetitive operations. In making the cathode cup of the aforementioned patent, considerable difficulty has been encountered in achieving a satisfactory high speed repetitive molding operation suitable for commercial operation. And various factors have resulted in numerous rejects and equipment failures when performing the molding operation in a modern high speed molding press.

The principal object of the invention has been the provision of a novel and improved molding apparatus which obviates these and other disadvantages and permits high speed repetitive molding operations.

More particularly, it has been a principal object of the present invention to provide a novel and improved piston and mold for molding thin-walled green carbon cathode cups and the like which yield good results in high speed repetitive operations.

Another object of the invention has been the provision of such a piston and mold which avoids arc formation and consequent equipment damage.

A further object of the invention has been the provision of such a piston and mold which produce a cup without soft regions.

Still another object of the invention has been the provision of such a piston and mold which prevent frequent cup breakage on ejection of the molded cup.

Other and further objects, features and advantages of the invention will appear more fully from the following description of the invention taken in connection with the appended drawings, in which:

FIG. 1 is a longitudinal sectional view of an assembled mold and piston embodying the invention;

FIG. 2 is an enlarged longitudinal sectional view of the piston of FIG. 1;

FIG. 3 is a longitudinal sectional view of the mold of FIG. 1;

FIG. 4 is a top plan view of the mold of FIG. 3;

FIG. 5 is a longitudinal sectional view of a modified form of piston embodying the invention;

FIG. 6 is a top plan view of the piston of FIG. 5;

FIG. 7 is a longitudinal sectional view of a modified form of mold embodying the invention and adapted for use with the piston of FIG. 5;

FIG. 8 is a top plan view of the mold of FIG. 7; and

FIG. 9 is a longitudinal sectional view illustrating the piston of FIG. 5 and the mold of FIG. 7 assembled.

Referring now to the drawings, and more particularly to FIGS. 1-4, the molding apparatus comprises a mold 10 and a piston 11 adapted to be inserted in and slide axially within mold 10

The mold 10 comprises an annular base 12, an annular socket 13 which fits into a correspondingly shaped opening in the inside bottom of base 12, and a hollow cylindrical body 14. A lower portion 15 of body 14 has external threads at the lower end thereof which engage internal threads in base 12 to hold body 14 and base 12 in assembled relationship. The internal surface of the lower end of body 14 fits snugly but slidably against the adjacent outer side surface of socket 13. The upper end of socket 13 is provided with an opening 16 which is shaped to receive a metal end cap closure for a D-size dry cell battery.

The central hole in socket 13 is closed by a removable metal plug 17 having a radial flange 18 which seats against an internal shoulder 19 in socket 13. The lower end of plug 17 extends to a point just above the upper surface of a metal closure plate 20 which closes the bottom end of the central hole in socket 13. A coil spring 21 is wound around the lower end of plug 17 and acts against the upper surface of plate 20 and the lower surface of flange 19. Spring 21 urges plug 17 into the position shown but permits the plug to be pushed downward during the molding operation until the upper edge thereof is flush with the bottom of opening 16 and the lower edge thereof contacts plate 20. During operation the plate 20 will be held against the molding pressure by contact with the adjacent press platen.

A circumferential slot 22 in the outer surface of base 12 is provided for holding the mold 10 in a suitable press structure (not shown) but which in its simplest form would be of the type shown in the aforementioned Balaguer patent, i.e., simply a pair of opposed press platens for applying both molding pressure and heating current. A pair of spring clips 23, 24 are affixed to a radially extending flange 25 of base 12 and serve to hold one end of a mold positioning spring 26 which is wrapped around a portion of body 14. Clips 23 and 24 hold a flattened end of spring 26 in an annular seat 27 in base 12.

The lower portion 15 of body 14 has an external diameter substantially less than that of an upper portion 28, resulting in portion 15 having a substantially thinner wall than portion 28. Typically, the portion 15 might have an outside diameter of 1.75", while the portion 28 might have an outside diameter of 2", yielding a width for the annular shoulder 29 which separates the portions 15 and 28 of 0.125". The internal diameter of portions 15 and 28 are smoothly tapered, e.g., from a typical value of 1.292" at the upper end of portion 28 to a typical value of 1.290" at the lower end of portion 15. The foregoing and other numerical values set forth herein are given by way of illustration and should not be considered as limiting the invention. The values are all for a nominal D-size cell and would, of course, be greatly different for other sizes of cell.

The piston 11 is slidable from a position completely outside the mold 10 to the position shown in FIG. 1. The piston 11 comprises an annular body 30 having a circular axially extending central space 31 within which is slidably mounted a cup ejecting pin 32. Upper and lower ends 33 and 34, respectively, of pin 32 have a close sliding fit with the walls of space 31. Ends 33 and 34 are separated by a reduced diameter portion 35 which has a substantial clearance from the walls of space 31, e.g., $\frac{1}{16}$".

The upper end of piston body 30 is champfered, as shown at 36. As shown in FIG. 1, an upper portion 37 of piston body 30 has a clearance from the internal walls of mold 10. The piston body 30 is provided with an annular groove 38 for clamping purposes to permit ejection of the molded cup by action of ejecting pin 32. The upper end of groove 38 is curved, as shown at 39, while the lower end thereof is a sharp shoulder, as shown at 40.

The shoulder 40 is formed on the upper side of a radial flange 41. Flange 41, like portion 37, clears the mold wall. An annular electrically insulating washer 42 is mounted directly below flange 41. The washer 42 might be made of any suitable material such as nylon or Teflon (a plastic consistin of tetrafluoroethylene polymer, sold by E. I. du Pont de Nemours & Co.). Below the washer 41 there is mounted on piston body 30 an elongated electrically insulating sleeve 43 which terminates at its lower end in an electrically insulating washer 44. If desired, the washer 44 may be integral with the sleeve 43. The sleeve 43 and washer 44 might be made of nylon, Teflon or other suitable material. A metal sleeve 45 is mounted on insulating sleeve 43 and extends axially from washer 44 to washer 42.

The location of washer 44 relative to the bottom end of position body 30 is selected so that this distance represents the height of the cup wall, e.g., 1.97". The thickness of the cup wall is the same as the radial extent of washer 44 and typically might be ³⁄₃₂", ¹⁄₁₆" or ¹⁄₃₂".

A screw 46 is threaded into a hole 47 extending through sleeves 43 and 45 and piston body 30. The screw 46 extends into an annular space 48 between portion 35 of pin 32 and the internal walls of piston body 30. Contact between the lower portion or head 34 of pin 32 and screw 46 determines the uppermost position of pin 35 and hence sets the height of the cup center rod which is formed in the space 31 below head 34.

In operation, the piston 11 is withdrawn from the mold 10 and a metal end cap is inserted into the recess 16. The charge of carbonaceous molding powder is inserted in the mold and the piston 11 is inserted into the mold to compress the powder and cause it to fill the space between the walls of the mold and the walls of the piston. Substantial hydraulic pressure, e.g., 20,000 pounds, is applied to the position and a high density electrical current is passed through the piston, thence through the charge, and thence into the mold walls. The current may be as high as 25,000 amperes, although 15,000 amperes would be more typical, and the time of current application typically might be 1 to 2 seconds. The top of piston 11 may serve as one electrical terminal, and the mold base 12 may serve as the other terminal, current being delivered to these terminals through the press platens. It is, of course, important that no current path be provided from the piston to the mold except through the molding powder change.

The mold base 12 may be made of any suitable high strength electrically conductive material, e.g., a high strength tool steel.

The mold body 14 should be made of a material whose electrical resistivity is high as compared to copper and whose thermal conductivity is low as compared to copper. If these conditions are not met, a rapid flow of heat in the mold walls away from the charge area will prevent adequate heating of the walls of the cup being molded. This condition is aggravated by the short heating cycle, typically 1 to 2 seconds. To assist in slowing heat dissipation in the mold during the heating interval, heat flow away from the charge area is inhibited by making the walls of the mold thinner in the lower portion 15 than in the upper portion 28. A thin mold wall in the lower section 15 also increases mold heating by increasing the current density in the mold wall adjacent the mix. It is desirable that the upper mole section 28 be relatively thick to avoid excessive heating of the piston and damage to the insulating sleeve.

A particularly desirable material for the mold body 14 is a ductile cobalt-base high temperature alloy sold by Haynes Stellite Company division of Union Carbide Corporation under the trademark Haynes Alloy No. 25. This alloy has a composition of 9–11% nickel, 19–21% chromium, 14–16% tungsten, up to 3% iron, .05 to .15% carbon, up to 1% silicon, 1 to 2% manganese, and the balance cobalt. The electrical resistivity thereof is 88.7 microhm centimeters as compared to 1.724 microhm centimeters for annealed copper. In general, the resistivity of the mold body 14 should be many times higher than the resistivity of copper and should be substantially higher than tool steel.

The piston body 30 should be made from a material which has electrical and thermal conductivity characteristics similar to those of copper but which is harder. A chromium copper alloy has been found to be particularly desirable for this purpose, for example, the chromium-copper alloy sold by Anaconda American Brass Company of Waterbury, Connecticut, under the designation Chromium Copper—999. The 999 alloy has a nominal composition of 99.05% copper, 0.85% chromium, and 0.10% silicon. This material has a thermal conductivity about 80% that of copper. The ejector pin 32 should be made from a very hard material such as tool steel.

The 999 alloy may also be used with advantage for the mold base 12 to provide good electrical contact between the press platen and the mold base. If the press platen be made of hardened tool steel, the 999 alloy mold base will conform well to the press platen surface.

A particular problem to which the mold and piston of the invention are subjected is that raised by the inherent non-uniformity of the charge, both initially and as molding progresses. The result of this non-uniformity is a tendency for current to concentrate in discrete small volumes of the mix which in turn results in local overheating, a progressive decrease in resistivity of those volumes, and still further current concentration. The end result is a buildup of hot spots in the carbon charge which causes electrical arcs to form and effectively destroy the piston and/or mold by burning the nearby surfaces thereof. Steel, for example, is unsuitable for the piston material, as is the Haynes Alloy 25, because the thermal conductivities are too low to permit dissipation of heat from those portions of the piston adjacent carbon hot spots in the short time available. The 999 alloy, on the other hand, has a high thermal conductivity (about 80% that of copper) which is sufficient for heat flow along the piston to dissipate the heat from hot spots, thus preventing formation of arcs. In this regard, it should be remembered that heat cannot effectively be radiated outwardly by the piston so that heat dissipation in the short time available (1 to 2 seconds usually) must be by heat flow along the piston.

The situation as regards the mold is different, since the mold is more massive than the piston and can radiate heat outwardly. Hence hot spot formation does not present a serious problem so far as the mold walls are concerned. What presents a problem with the mold is conduction of heat away from the inner mold face and consequent loss of heating of the charge. By selecting a relatively low thermal conductivity material for the mold walls and making the mold walls thin in the heating region (portion 15), the loss of heat is minimized.

The sleeve 45 is preferably made from the same material as the piston body 30, e.g., a chromium copper alloy.

Referring now to FIGS. 5–9, there is illustrated a modified form of piston and mold construction according to the invention in which the electrical insulation which prevents direct transfer of current from the piston to the mold is carried by the mold rather than the piston.

The mold is shown in detail in FIGS 7 and 8 and is similar to the mold of FIGS. 3 and 4. The mold, designated 49, comprises an annular base 50 within which is mounted a socket 51. The socket 51 is solid instead of being hollow like the socket 13. The mold 49 also comprises a hollow cylindrical body 52 having an upper portion 53 and a lower portion 54 separated by a radial shoulder 55.

The upper portion 53 of the mold body is provided with a bore 56 which extends from the upper end of mold body 52 nearly to shoulder 55. The bore 56 contains a cylindrical insert or sleeve 57 the inside surface of which serves as a continuation of the inside surface of lower portion 54. The sleeve 57 is preferably made from a high strength heat resistant ceramic material such as a sintered aluminum oxide.

Slidable within the mold 49 is a piston 58 shown in detail in FIGS. 5 and 6. The piston 58 is similar to the piston 11 but lacks the insulating sleeve 43 and the metal sleeve 45. The piston 58 comprises an annular body 59 having a circular axially extending central space 60 within which is slidably mounted an ejecting pin 61. The lower end of piston body 59 has a reduced outside diameter affording a radial shoulder 62 against which is seated an electrically insulating washer 63. The washer 63 serves to prevent direct electrical contact between the piston and the mold in the region of the upper end of the battery cup. The washer 63 may be made of any suitable material, e.g., nylon, Teflon or glass fiber material (such as Fiberglas).

A narrow, shallow annular groove 64 is provided in the piston outer wall slightly above the shoulder 62. The groove 64 typically might be 1/16" wide x 1/32" deep and be spaced 0.1 to 0.2" from shoulder 62. The groove 64 serves as a heat damper to inhibit or slow down heat flow upwardly along the piston from the lower portion to the upper portion.

Corresponding elements of FIGS. 5–9 are preferably made of the same materials as described in connection with FIGS. 1–4.

In FIG. 9 there are shown diagrammatically opposing press platens 65 and 66 and a transformer 67 serving as a source of power. The secondary winding of the transformer is connected to the two press platens to supply thereto the operating current.

While the invention has been described in connection with specific embodiments thereof and in specific uses, various modifications thereof will occur to those skilled in the art without departing from the spirit and scope of the invention as set forth in the appended claims.

What is claimed is:

1. Molding apparatus for molding under pressure and through electrical resistance heating a thin-walled green carbon cup having a closed end; comprising an annular mold closed at one end and open at the other end, the closed end of said mold having an internal shape corresponding to the shape of said closed end of said cup and the wall of the central space in said mold corresponding to the shape of the walls of said cup, the axial length of said central space in said mold being substantially greater than the height of the walls of said cup, said mold being adapted to receive in said central space a charge of carbonaceous molding material, at least that portion of the walls of said mold which contact the walls of a cup being molded being formed from an electrically conductive metal having an electrical resistance many times greater than that of copper and a thermal conductivity many times less than that of copper; an annular piston slidable in the central space within said mold from a position completely outside of said mold to a position within said mold, said piston having a shape and dimensions selected so that when said piston is inserted into said mold under pressure a charge of carbonaceous molding material in said mold is caused to assume the shape and dimensions of said cup between said piston and said mold, said piston being formed from an electrically conductive metal having an electrical conductivity and a thermal conductivity not less than about 80% of the conductivity of copper; electrical insulating means disposed between said piston and said mold when said piston is inserted in said mold to prevent direct transfer of electrical energy from said piston to said mold; and a separate annular electrically insulating washer mounted on the exterior of said piston at a point at which said washer will contact the carbonaceous molding powder forming the free end of the cup being molded.

2. Molding apparatus for molding under pressure and through electrical resistance heating a thin-walled green carbon cup having a closed end and a central rod projecting upwardly from said closed end; comprising an annular mold closed at one end and open at the other end, the closed end of said mold having an internal shape corresponding to the shape of said closed end of said cup and the wall of the central space in said mold corresponding to the shape of the walls of said cup, the axial length of said central space in said mold being substantially greater than the height of the walls of said cup, said mold being adapted to receive in said central space a charge of carbonaceous molding material, at least that portion of the walls of said mold which contact the walls of a cup being molded being formed from an electrically conductive cobalt base high temperature alloy having an electrical resistance of the order of 50 times that of copper and a thermal conductivity many times less than that of copper; an annular piston slidable in the central space within said mold from a position completely outside said mold to a position within said mold, said piston having a shape and dimensions selected so that when said piston is inserted into said mold under pressure a charge of carbonaceous molding material in said mold is caused to assume the shape and dimensions of said cup between said piston and said mold, said piston being formed from an electrically conductive chromium-copper alloy having an electrical conductivity and a thermal conductivity not less than about 80% of the conductivity of copper; an ejector pin slidable in the central space in said piston to eject a molded cup; and electrical insulating means disposed between said piston and said mold when said piston is inserted in said mold to prevent direct transfer of electrical energy from said piston to said mold.

3. Molding apparatus for molding under pressure and through electrical resistance heating a thin-walled green carbon cup having a closed end and a central rod projecting upwardly from said closed end; comprising an annular mold closed at one end and open at the other end, the closed end of said mold having an internal shape corresponding to the shape of said closed end of said cup and the wall of the central space in said mold corresponding to the shape of the walls of said cup, the axial length of said central space in said mold being substantially greater than the height of the walls of said cup, said mold being adapted to receive in said central space a charge of carbonaceous molding material, at least that portion of the walls of said mold which contact the walls of a cup being molded being formed from an electrically conductive metal having an electric resistance many times greater than that of copper and a thermal conductivity many times less than that of copper; an annular piston slidable in the central space within said mold from a position completely outside said mold to a position within said mold, said piston having a lower portion with a shape and dimensions selected so that when said piston is inserted into said mold under pressure a charge of carbonaceous molding material in said mold is caused to assume the shape and dimensions of said cup between said piston and said mold, said piston having an upper portion with a diameter substantially less than the diameter of said central space in said mold, said piston being formed from an electrically conductive metal having an electrical conductivity and a thermal conductivity not less than about 80% of the conductivity of copper; an ejector pin slidable in the central space in said piston to eject a molded cup; an electrically insulating sleeve surrounding and carried on said upper portion of said piston to prevent direct transfer of electrical energy from said piston to said mold when said piston is inserted in said mold; a metallic sleeve surrounding and carried on said electrically insulating sleeve and being arranged to be in sliding contact with the walls of said mold when said piston is inserted in said mold; and an electrically insulating annular washer surrounding and carried on said piston at a point at which said washer will contact the carbonaceous molding powder forming the free end of the cup being molded.

4. Molding apparatus for molding under pressure and through electrical resistance heating a thin-walled green carbon cup having a closed end and a central rod projecting upwardly from said closed end; comprising an annular mold closed at one end and open at the other end, the closed end of said mold having an internal shape corresponding to the shape of said closed end of said cup and the wall of the central space in said mold corresponding to the shape of the walls of said cup, the axial length of said central space in said mold being substantially greater than the height of the walls of said cup, said mold being adapted to receive in said central space, a charge of carbonaceous molding material, at least that portion of the walls of said mold which contact the walls of a cup being molded being formed from an electrically conductive metal having an electrical resistance many times greater than that of copper and a thermal conductivity many times less than that of copper; an annular piston slidable in the central space within said mold from a position completely outside said mold to a position within said mold, said piston having a shape and dimensions selected so that when said piston is inserted into said mold under pressure a charge of carbonaceous molding material in said mold is caused to assume the shape and dimensions of said cup between said piston and said mold, said piston being formed from an electrically conductive metal having an electrical conductivity and a thermal conductivity not less than about 80% of the conductivity of copper; an ejector pin slidable in the central space in said piston to eject a molded cup; electrical insulating means disposed between said piston and said mold when said piston is inserted in said mold to prevent direct transfer of electrical energy from said piston to said mold; and an annular electrically insulating washer mounted on the exterior of said piston at a point at which said washer will contact the carbonaceous molding powder forming the free end of the cup being molded; said piston having a circumferential groove in the periphery thereof adjacent said washer and on the opposite side thereof from said base of said mold, said groove having a radial depth at least approximately equal to the wall thickness of the cup being molded.

References Cited by the Examiner
UNITED STATES PATENTS

| | | |
|---|---|---|
| 2,738,407 | 3/1956 | Dupont. |
| 2,903,499 | 9/1959 | Balaguer _____ 136—107 |

J. SPENCER OVERHOLSER, *Primary Examiner.*

MICHAEL V. BRINDISI, *Examiner.*